United States Patent
Park et al.

(10) Patent No.: US 12,155,787 B2
(45) Date of Patent: Nov. 26, 2024

(54) TERMINAL SET COMPRISING TWO ADJACENT DISPLAYS, AND METHOD FOR CONTROLLING AN OUTPUT OF THE ADJACENT DISPLAYS

(71) Applicant: LG ELECTRONICS INC., Seoul (KR)

(72) Inventors: Joo Hyun Park, Seoul (KR); Tae Sung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 311 days.

(21) Appl. No.: 17/627,268

(22) PCT Filed: Jul. 18, 2019

(86) PCT No.: PCT/KR2019/008855
§ 371 (c)(1),
(2) Date: Jan. 14, 2022

(87) PCT Pub. No.: WO2021/010525
PCT Pub. Date: Jan. 21, 2021

(65) Prior Publication Data
US 2022/0263938 A1      Aug. 18, 2022

(51) Int. Cl.
*H04M 1/72454*  (2021.01)
*G06F 1/16*  (2006.01)
(Continued)

(52) U.S. Cl.
CPC ...... *H04M 1/72454* (2021.01); *G06F 1/1647* (2013.01); *H04M 1/0266* (2013.01);
(Continued)

(58) Field of Classification Search
CPC .. G06F 1/16–1622; H04M 1/02–0233; H04M 1/724–72409; H04M 1/72454; H04M 2201/38; H04M 2250/12

See application file for complete search history.

(56) References Cited

U.S. PATENT DOCUMENTS 8,078,134 B2     12/2011  Kang et al.
2010/0321275 A1*  12/2010  Hinckley .............. G06F 1/1618
                                                              345/1.3
(Continued)

FOREIGN PATENT DOCUMENTS

EP          2 741 173 A2    6/2014
KR    10-2009-0125544 A    12/2009
(Continued)

*Primary Examiner* — Ronald Eisner
(74) *Attorney, Agent, or Firm* — Birch, Stewart, Kolasch & Birch, LLP

(57)  ABSTRACT

The present disclosure provides a terminal set including an extended display and, more specifically, a terminal set having a main body and a sub body fastened to each other. The terminal set includes an inclination sensor mounted on the main body so as to sense the inclination of the main body, and a controller for executing an application and thereby controlling a first display of the main body or a second display of the sub body so as to output the application. If the controller receives a new output signal regarding a first application in a state in which the sensed inclination of the main body is within a screen rotation nonactivation range, the controller retrieves an output rotation value allocated to the first display and an output rotation value allocated to the second display.

4 Claims, 11 Drawing Sheets

(51) Int. Cl.
*H04M 1/02* (2006.01)
*H04M 1/72409* (2021.01)

(52) U.S. Cl.
CPC ............. *H04M 1/724092* (2022.02); *G06F 2200/1614* (2013.01); *H04M 2201/38* (2013.01)

(56) References Cited

U.S. PATENT DOCUMENTS

| | | |
|---|---|---|
| 2015/0116362 A1 | 4/2015 | Aurongzeb et al. |
| 2017/0039019 A1 | 2/2017 | de Paz |
| 2019/0163432 A1* | 5/2019 | Files .................. G06F 3/147 |
| 2021/0019022 A1 | 1/2021 | Yi |

FOREIGN PATENT DOCUMENTS

| | | |
|---|---|---|
| KR | 10-2015-0094788 A | 8/2015 |
| KR | 10-2018-0097693 A | 8/2018 |
| KR | 10-1984683 B1 | 5/2019 |
| WO | WO 2012/082104 A1 | 6/2012 |

* cited by examiner (a)

(b)

(a)

(b)

(c)

(a)

(b)

(c)

TERMINAL SET COMPRISING TWO ADJACENT DISPLAYS, AND METHOD FOR CONTROLLING AN OUTPUT OF THE ADJACENT DISPLAYS

CROSS REFERENCE TO RELATED APPLICATIONS

This application is the National Phase of PCT International Application No. PCT/KR2019/008855, filed on Jul. 18, 2019, all of which is hereby expressly incorporated by reference into the present application.

TECHNICAL FIELD

This disclosure relates to a terminal set including a mobile terminal provided with a display and an extended display, a method for controlling an output direction of multiple displays and performing the method.

BACKGROUND ART

A mobile terminal refers to a handheld computing device that a user may carry and use without being fixed at a location. A typical example of a mobile terminal is a smart phone.

The functions of mobile terminals are diversifying. For example, there are functions for data and voice communication, photo and video shooting through a camera, voice recording, music file playback through a speaker system, and output of images or videos on displays. Some terminals have an electronic game play function added or perform a multimedia player function. In particular, the recent mobile terminals may receive multicast signals that provide broadcast and visual content such as video or television programs.

As such a mobile terminal has diversified functions, it is embodied in the form of a multimedia player device having complex functions such as, for example, taking pictures or videos, playing music or video files, playing games, and receiving broadcasts.

In particular, as 5G communication standard is commercialized, various application cases using advantages such as fast communication speed and low latency are being developed. For example, it is possible to use it by various devices using a communication network being interlocked and interacting with each other without delay, or transmitting and receiving high-capacity data without interruption.

According to the trend, development of a multitasking method such as outputting a plurality of contents on a large screen or outputting a plurality of contents on a plurality of screens is also continuously being made.

As an aspect, there is a form in which a mobile terminal and a case to which the mobile terminal is coupled have a display, respectively (hereinafter referred to as a "terminal set"). In such a terminal set, it is common that the respective corners of the two displays are arranged to be adjacent to each other and output. It is common for the two adjacent displays to be output in a vertical mode (or referred to as a portrait) and arranged left and right, or output in a horizontal mode (or referred to as a landscape) and arranged up and down for use.

Further, the screen output direction is determined by a direction sensor provided in the device. In a situation where the direction of the device is not clear or a user's separate operation possibility is expected to be high, the direction sensor operates irrespective of the sensed direction of the device. Due to the algorithm, there is a problem that even though one of the two screens is used in the horizontal mode, the other screen is output in the vertical mode.

DISCLOSURE OF INVENTION

Technical Goals

An aspect provides a terminal set including the previously described extended display which solves a problem that a plurality of displays are output in the directions different from each other for a reason that an inclination value of the device measured by the sensor is within an unaffected range.

Technical Solutions

According to an aspect, there is provided a terminal set including a main body and a sub body fastened to each other, the terminal set including, a first display provided on the main body, a second display provided on the sub body, an inclination sensor mounted on the main body configured to sense an inclination of the main body, and a controller configured to execute an application so that the application is output on the first display or the second display, wherein the controller, if receives a new output signal regarding a first application in a state in which the sensed inclination of the main body is within a screen rotation nonactivation range, retrieves an output rotation value allocated to the first display and an output rotation value allocated to the second display, and if at least one thereof is an output rotation value corresponding to a horizontal mode, outputs the first application in the horizontal mode.

According to another aspect, there is provided a terminal set, wherein the new output signal regarding the first application may include at least one of an output movement signal to the second display of the first application which is being output on the first display, an output movement signal to the first display of the first application which is being output on the second display, an output signal of the first application of a lower stack by an output movement of an application of an upper stack, and an output signal regarding the first application in a state in which a background is executed or not executed.

According to another aspect, there is provided a method of controlling a terminal set including a main body and a sub body fastened to each other, a first display provided on the main body and a second display provided on the sub body, the method including, receiving a new output signal regarding a first application, determining whether an inclination of the main body sensed by a sensor is within a screen rotation nonactivation range, determining, if the inclination is within the screen rotation nonactivation range as a determination result, whether an output rotation value of the first display or an output rotation value of the second display matches an output rotation value of a horizontal mode, and outputting, if at least one of the output rotation values matches the output rotation value of the horizontal mode as a determination result, the first application in the horizontal mode.

Effects

Effects of a terminal auxiliary device according to the present disclosure are as follows.

According to at least one of example embodiments of the present disclosure, it is possible to solve a problem that when a plurality of displays are used, the output directions of the displays are different from each other if a new screen is output.

Further scope of applicability of the present disclosure will become apparent from the following detailed description. However, since various changes and modifications within the scope of the present disclosure can be clearly understood by those skilled in the art, the detailed description and specific embodiments such as the example embodiments of the present disclosure should be understood as mere examples.

BEST MODE FOR CARRYING OUT THE INVENTION

Figure 1:
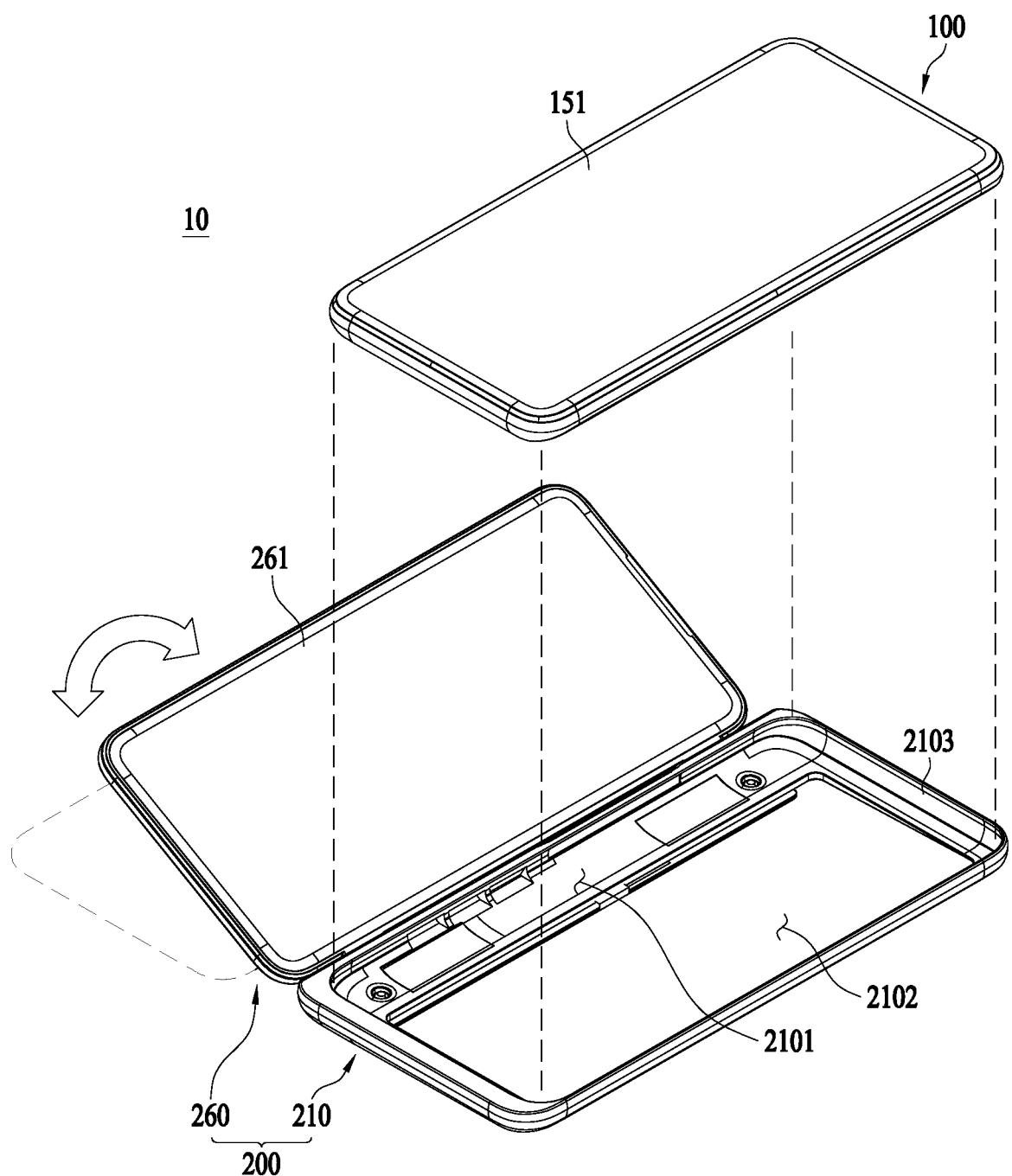
FIG. 1 illustrates a perspective view before a mobile terminal of a terminal set and a terminal auxiliary device are fastened.

Hereinafter, the example embodiments disclosed herein will be described in detail with reference to the accompanying drawings, but regardless of the numbers of drawings the same or similar components refer to the same reference numeral, and redundant description thereof will be omitted. The suffixes "module" and "part" for the components used in the following description are given or mixed in consideration of the ease of writing the specification, and do not have distinct meanings or roles by themselves. In addition, in describing the example embodiments disclosed in the specification, if it is determined that detailed description of related known technologies may obscure the gist of the example embodiments disclosed in the specification, the detailed description thereof will be omitted. In addition, the accompanying drawings are only for easy understanding of the example embodiments disclosed in the specification, and the technical idea disclosed herein is not limited by the accompanying drawings, and all modifications included in the scope of the present disclosure should be understood to include equivalents or substitutes.

The terms such as "first" and "second" as used herein may use corresponding components regardless of importance or an order and are used to distinguish a component from another without limiting the components. These terms may be used for the purpose of distinguishing one element from another element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element.

A singular expression includes a plural expression unless the context clearly dictates otherwise.

The terms "have," "may have," "include," and "may include" as used herein indicate the presence of corresponding features (for example, elements such as numerical values, functions, operations, or parts), and do not preclude the presence of additional features.

Figure 2:
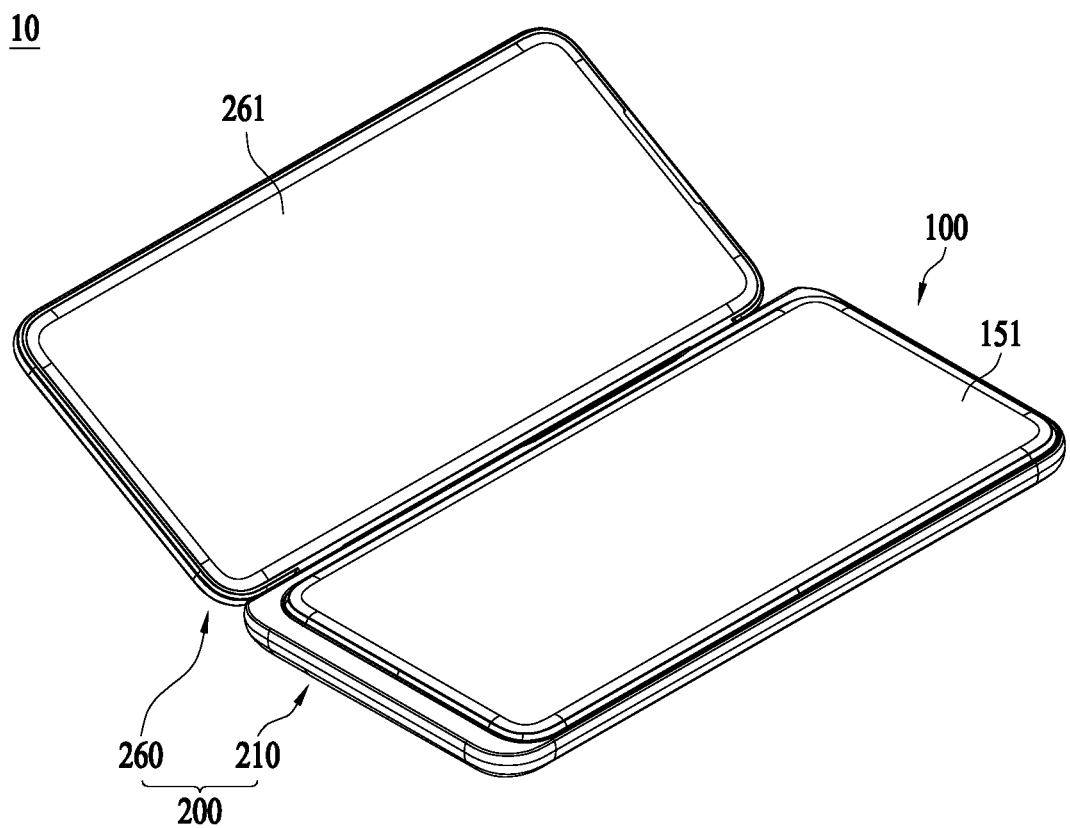
FIG. 2 illustrates a perspective view after the mobile terminal of the terminal set and the terminal auxiliary device are fastened.

FIGS. 1 and 2 respectively illustrate perspective views before and after a mobile terminal 100 of a terminal set 10 and a terminal auxiliary device 200 are fastened.

The terminal set 10 includes the mobile terminal 100 provided with a display and the terminal auxiliary device 200 providing an extended display by the mobile terminal 100 being fastened. The mobile terminal 100 is fastened in a seating area of the terminal auxiliary device 200 in a state in which the display is exposed to the front. The terminal auxiliary device 200 further includes a terminal case 210 that is an area where the mobile terminal 100 is fastened, and a display case 260 that is connected to the terminal case 210 and where the extended displayed is mounted. The terminal case 210 and the display case 260 may be rotated to be folded or unfolded.

As described above, the terminal set 10 increases usability by each the mobile terminal 100 and the terminal auxiliary device 200 forming an output area and providing multiple displays. A display provided on the mobile terminal 100 is defined as a first display 151, and a display provided on the terminal auxiliary device 200 is defined as a second display 261. In some cases, the mobile terminal 100 or the terminal auxiliary device 200 may include an additional display in addition to the first display 151 or the second display 261, and in such a case, the features of the present disclosure may be applied in the same principle.

The first display 151 and the second display 261 may be output in connection with each other. For example, the first display 151 and the second display 261 may be mirrored and output, or a screen output on the first display 151 may be moved and output on the second display 261. Alternatively, an execution screen of one application or a plurality of connected applications may be divided and output on the two displays 151 and 261. For example, a controller of a game application may output on the first display 151 and a game content on the second display 261. That is, the terminal set 10 of the present disclosure may operate as one device having a plurality of displays, which means that the terminal auxiliary device 200 shares various configurations provided in the mobile terminal 100.

More specifically, the controller and a power supply part of the mobile terminal 100 may supply power to the second display 261 as well as the first display 151 and transmit and receive data. Therefore, the terminal auxiliary device 200 may operate without a separate controller or power supply part. This may reduce the weight or the volume of the terminal auxiliary device 200, and may achieve the effect of a reduction in manufacturing cost.

For power supply to the second display 261 and for transmitting and receiving date to and from the second display 261, the mobile terminal 100 may be physically fastened to the terminal auxiliary device 200, and the terminal auxiliary device 200 may include a circuit for electrically connecting the mobile terminal 100 and the second display 261.

Figure 3:
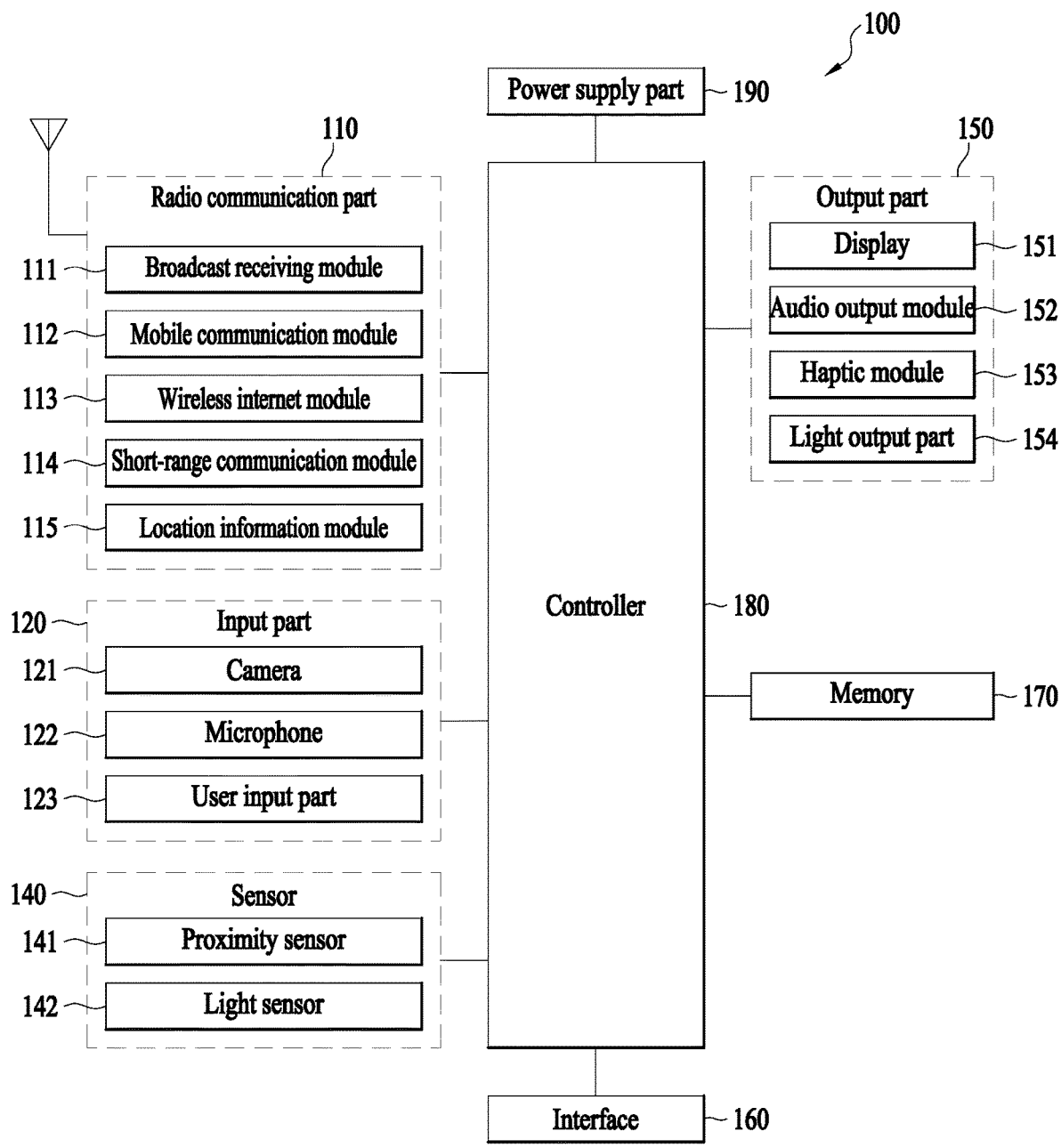
FIG. 3 is a block diagram explaining the mobile terminal.

FIG. 3 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 3 is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 3, or activating application programs stored in the memory 170. As one example, the controller 180 controls some or all of the components according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

In addition, the power supply 190 may include a charging port, and the charging port may be configured as an example of the interface 160 to which an external charger that supplies power for charging the battery is electrically connected.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Figure 4:
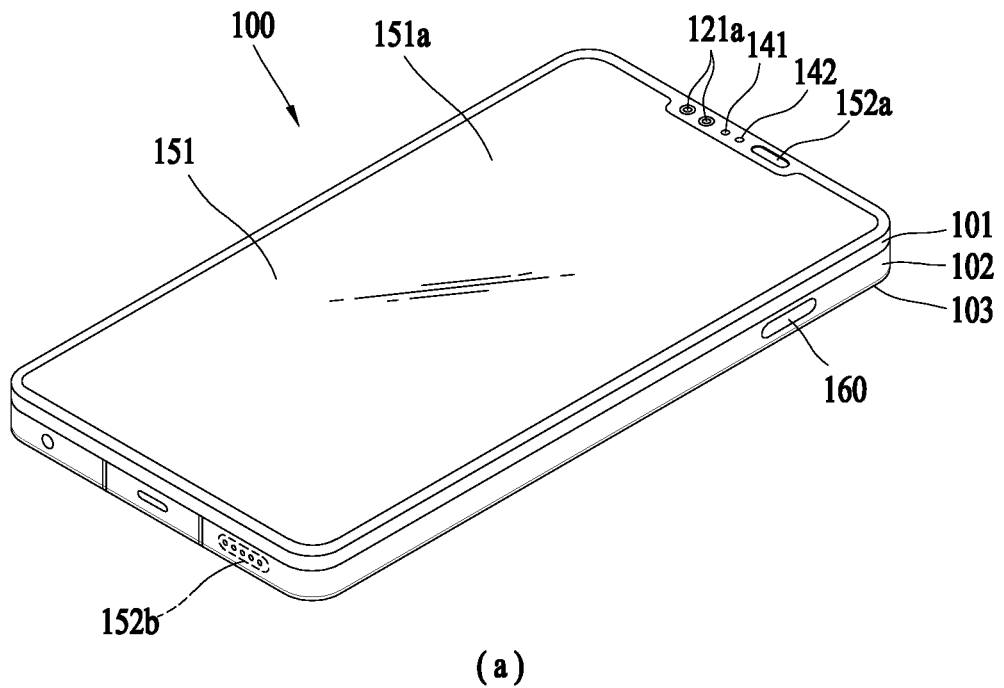
FIG. 4 illustrates a front perspective view and a rear perspective view of the mobile terminal.
Figure 4:
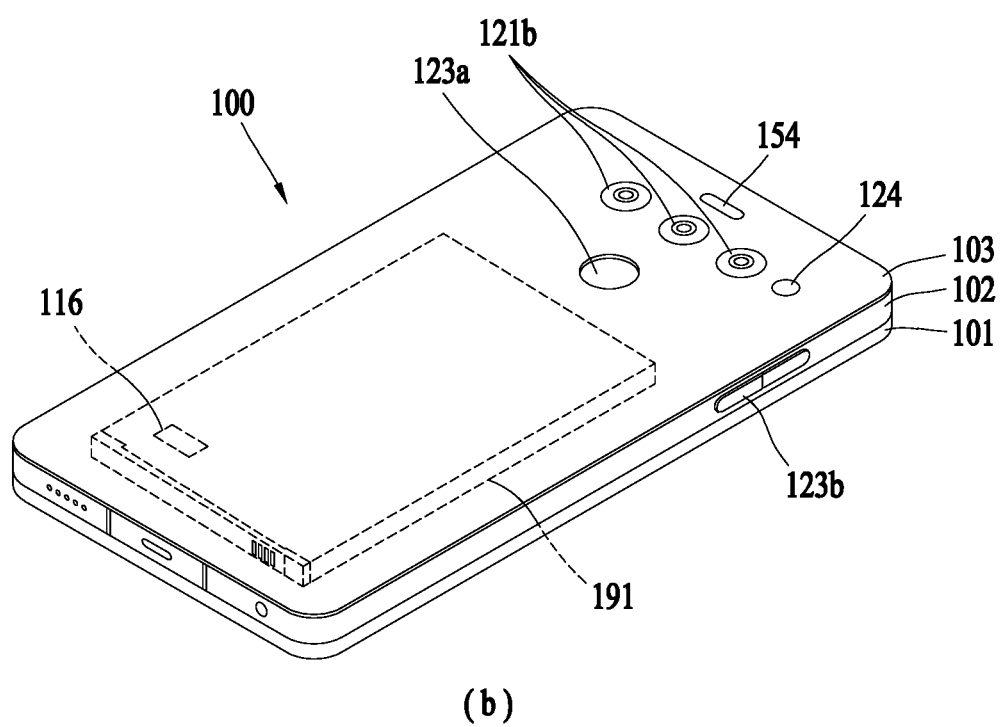

FIG. 4 is a front perspective view and a rear perspective view of the mobile terminal 100 related to the present invention.

The mobile terminal 100 of the present invention may be implemented as a bar-shaped terminal body as shown in FIGS. 4(*a*) and 4(*b*), but is not limited thereto, and as described in FIGS. 1 and 2, the mobile terminal 100 is sufficient if it can be combined with the terminal auxiliary device. As an example, a smart watch type mobile terminal may also be applied to the present invention. In this case, the terminal case of the terminal auxiliary device is coupled to the rear surface of the smart watch mobile terminal, and the folio cover is hinged to the terminal case so as to be rotatably coupled to the smart watch. The front of the mobile terminal will be optionally provided with a cover.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b, a light output unit 154, a flash 124, and a rear input unit 123a.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 includes a display unit 151, first and second sound output units 152a and 152b, a proximity sensor 141, an illuminance sensor 142, a light output unit 154, first and second sound output units 152a and 152b. Cameras 121a and 121b, first and second manipulation units 123a and 123b, a microphone 122, an interface unit 160, and the like may be provided.

Hereinafter, as shown in FIGS. 4(a) and 4(b), the mobile terminal 100 may be provided with the display unit 151, the first sound output unit 152a, the proximity sensor 141, and the illuminance sensor 142 on the front surface of the terminal body, the first camera 121a is disposed, the second manipulation unit 123b, the second sound output unit 152b, the microphone 122 and the interface unit 160 disposed on the front surface of the terminal body, the optical output unit 154, the manipulation unit 123a, the second camera 121b, and the flash 124 disposed on the rear surface of the terminal body.

However, these configurations are not limited to this arrangement. These components may be excluded or replaced as necessary, or may be disposed on different sides. For example, the manipulation unit may not be provided on the front surface of the terminal body, and the second sound output unit 152b may be provided on the rear surface of the terminal body rather than the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 3). Therefore, the touch screen may replace at least some of the functions of a manipulation unit.

The first audio output module 152a may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

A manipulation unit 123a as a touch key, but possible alternatives include a mechanical key, a push key, a touch key, and combinations thereof. In addition, the manipulation unit 123a may be configured in a layered form with the fingerprint sensor.

Input received at the first and second manipulation units 123a and 123b may be used in various ways. For example, the first and second manipulation units 123a and 123b may be used by the user to provide an input to a menu, home key, cancel, search, control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

As such, when the rear input unit is provided on the rear surface of the terminal body, a new type of user interface using the same can be implemented. In addition, the display unit 151 may be configured with a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 3) may be retractable into the terminal body. Alternatively, an antenna may be formed using a film attached to an inner surface of the rear cover 103, or a case that includes a conductive material.

A power supply unit 190 (see FIG. 3) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 5:
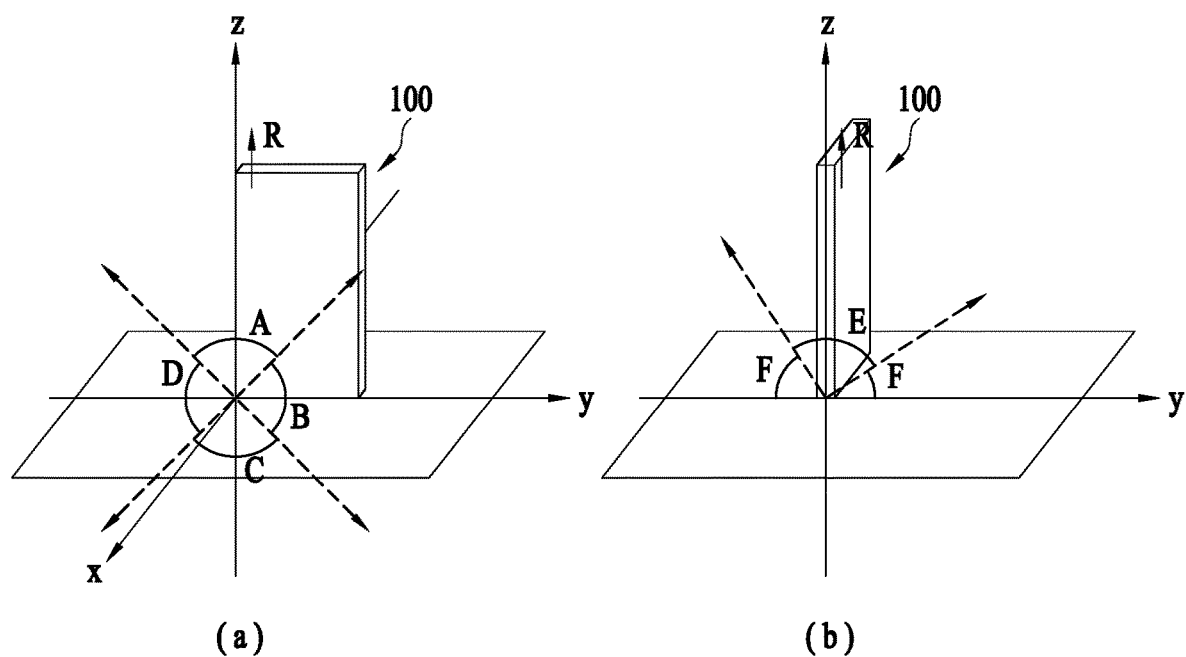
FIG. 5 is a concept diagram of the mobile terminal.
Figure 6:
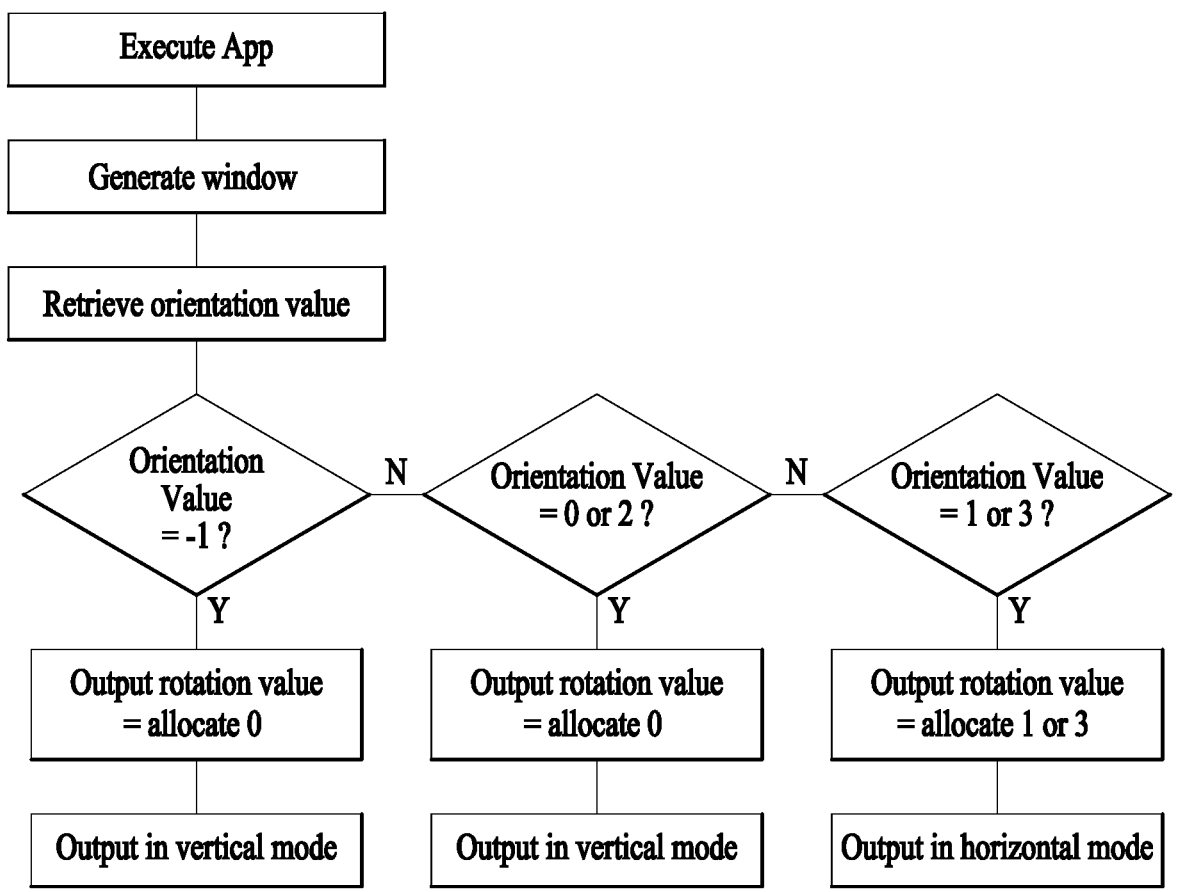
FIG. 6 is a flowchart on a screen output direction determination of the general mobile terminal.

FIG. 5 is a concept diagram of the mobile terminal 100. (a) of FIG. 5 illustrates boundaries of areas for a screen conversion determination according to the degree of the inclination of the mobile terminal 100 to the right and left, and (b) of FIG. 5 illustrates areas in which a screen conversion is not determined according to the degree of the inclination of the mobile terminal 100 forward and backward. FIG. 6 is a flowchart on a screen output direction determination of the general mobile terminal 100. FIGS. 5 and 6 are referred to together for better understanding.

The mobile terminal 100 provides an automatic screen rotation function. The automatic screen rotation function increases convenience for users by outputting in the horizontal mode if the screen is positioned in the horizontal direction with respect to the ground, and outputting in the vertical mode if positioned in the vertical direction.

The determination on the horizontal mode and the vertical mode is based on the degree of rotation of a display surface of the mobile terminal 100 on a vertical plane (the y-z axis based on (a) of FIG. 5) with respect to the ground (precisely, the self-weight direction, the z-axis based on (a) of FIG. 5) of the mobile terminal 100.

When the vertical upper axis of the mobile terminal 100, that is, the upper direction of the vertical axis of the display surface, is defined as R axis, if the R axis is in area A, with respect to the vertical axis of the ground, an output is in a normal vertical mode, if in area B, in a normal horizontal mode, if in area C, in a reverse vertical mode, and if in area D, in a reverse horizontal mode. In this case, area A may be in the range of 315 to 45 degrees, area B may be 45 to 135 degrees, area C may be 135 to 225 degrees, and area D may be 225 to 315 degrees.

Meanwhile, this automatic screen rotation is premised on the case where the mobile terminal 100 stands on the ground, that is, the R axis is located in area E in FIG. 5B. That is, if the mobile terminal 100 is inclined backward a certain angle or more, or forward a certain angle or more, as the R axis is located in area F, a screen rotation is not performed. This is because, in this case, it is reasonable to see the mobile terminal 100 as lying on the floor. Area E is defined as a "screen rotation activation area" and area F is defined as a "screen rotation nonactivation area." Area E may range from 60 degrees forward to 25 degrees backward with respect to the vertical axis of the ground.

From a programming point of view, an orientation value indicating an area in which the vertical upper axis of the mobile terminal 100 is located and an output rotation value indicating an output direction of the screen may be defined. For example, if the R axis is in area A, an orientation value may be 0, if in area B, an orientation value may be 1, if in area C, an orientation value may be 2, and in area D, an orientation value may be 3. Meanwhile, this is premised that the R axis is in area E at the same time, and in a case that the R axis is located in area F, an orientation value may be −1 regardless of which area it is in among areas A to D. Further, the normal vertical mode has an output rotation value of 0, the normal horizontal mode has an output rotation value of 1, the reverse vertical mode has an output rotation value of 2, and the reverse horizontal mode has an output rotation value of 3. This is a mere example, and the algorithm may be performed by defining other values as needed.

For convenience of description, the normal vertical mode and the reverse vertical mode are collectively referred to as the vertical mode, and the normal horizontal mode and the reverse horizontal mode are collectively referred to as the horizontal mode.

According to the algorithm, it may be set that if an orientation value is 0, an output rotation value is allocated to be 0, if an orientation value is 1, an output rotation value is 1, if an orientation value is 2, an output rotation value is 2, and if an orientation value is 3, an output rotation value is 3. In some cases, it may be set that if an orientation value is 2, an output rotation value is allocated to be 0.

Further, in principle, when an orientation value is −1, an output rotation value is allocated to be 0 as a default value. Therefore, if an application is executed in the state where an orientation value is −1, a screen is output in the normal vertical mode.

Figure 7:
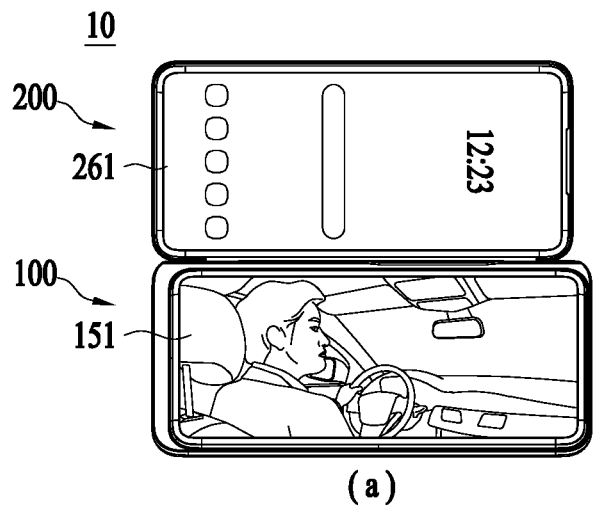
FIG. 7 is an example embodiment of the terminal set.
Figure 7:
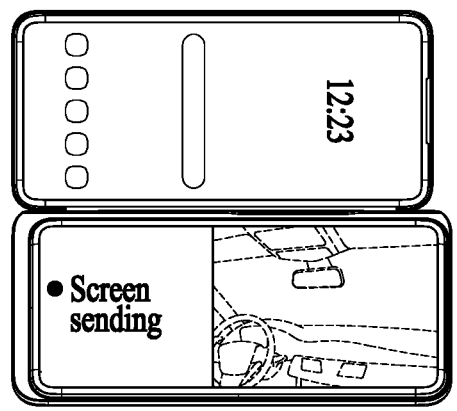
Figure 7:
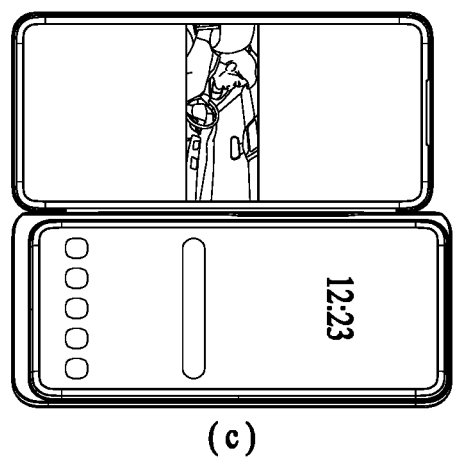

FIG. 7 is an example regarding the terminal set 10.

Regarding the terminal set 10 including the mobile terminal 100 and the terminal auxiliary device 200, the mobile terminal 100 operates with most of the components for implementing the present disclosure mounted. Accordingly, the mobile terminal 100 is defiled as the main body 100, and the terminal auxiliary device 200 is defined as the sub body 200. In addition, a sensor for measuring an inclination of the device may be provided in the main body 100. In principle, a controller is provided in the main body 100, but may be provided in the sub body 200 or in both bodies. Furthermore, a plurality of view framers that directly output to a display in the process to an output of the present disclosure may be provided corresponding to each display, but this component is also considered as a part of the controller.

Under the above assumption, both output rotation values of the first display 151 and the second display 261 depend on an orientation value of the main body 100.

That is, if an orientation value of the main body 100 is 0, both output rotation values of the main body 100 and the sub body 200 are allocated to be 0, and if an orientation value of the main body 100 is 1, both output rotation values of the main body 100 and the sub body 200 are allocated to be 1.

Further, if an inclination of the main body 100 measured by the sensor is in the screen rotation nonactivation area, that is, if an orientation value of the main body 100 is −1, in general, output rotation values of the main body 100 and the sub body 200 are allocated to be 0 as a default value (it is the same as described in FIG. 6), and a problem arises under this circumstance. For example, the first display 151 is outputting a specific application in the horizontal mode, and the second display 261 is outputting a home screen in the vertical mode, which is a default value. When a new application is output on the second display 261 in a state where an orientation value is −1, the new application is output in the vertical mode based on an output rotation value of the vertical mode of the second display 261, and it is different from the output direction of the first display 151. Not merely in this case, but also when a specific application being output on the first display 151 is moved to and output on the second display 261, the same result is brought, which makes use inconvenient.

The above situations are more problematic in the case of a device embodied with a plurality of displays, such as the first display 151 and the second display 261, unlike a traditional mobile terminal in which one display is provided.

Figure 8:
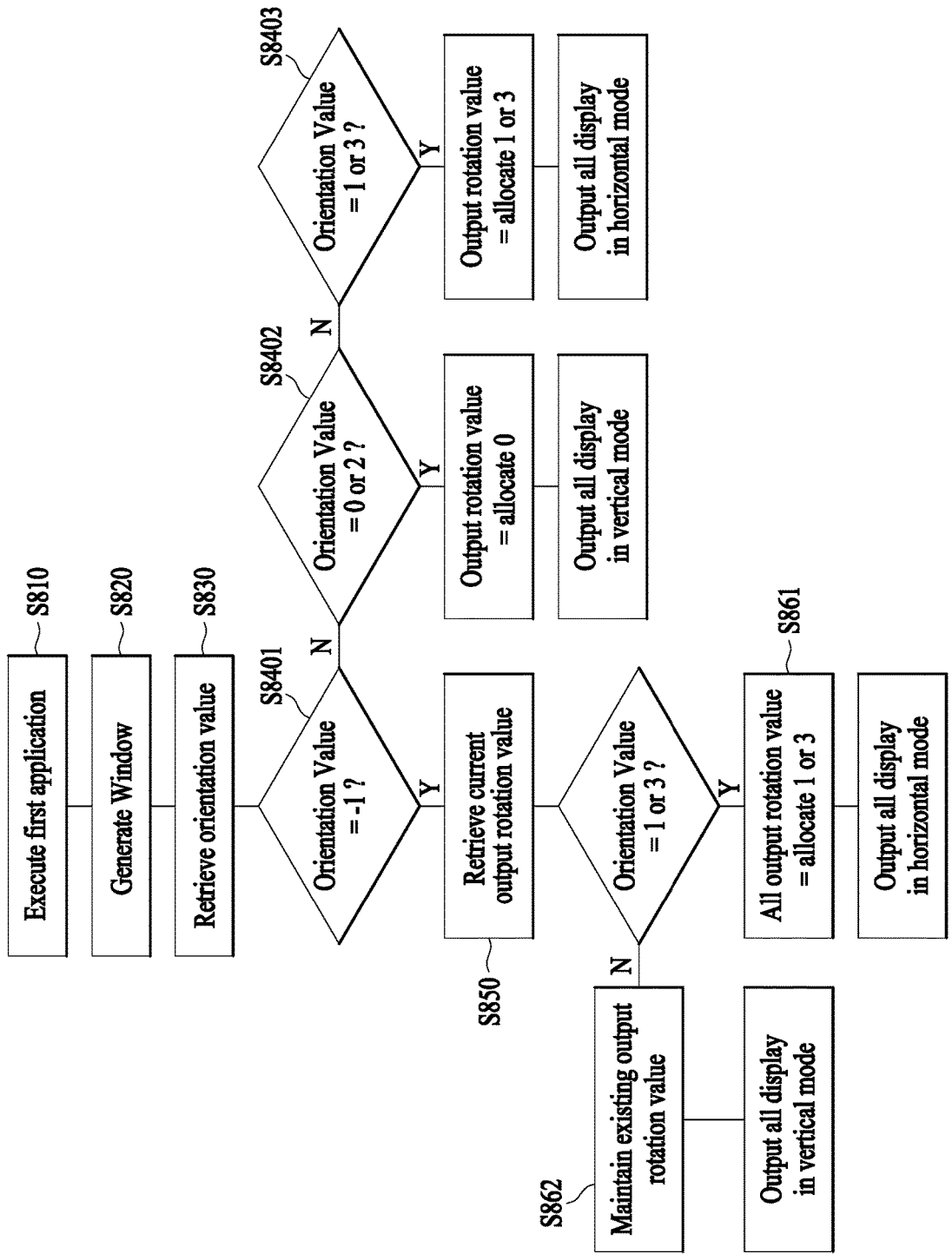
FIG. 8 is a flowchart related to an operation of the terminal set.
Figure 9:
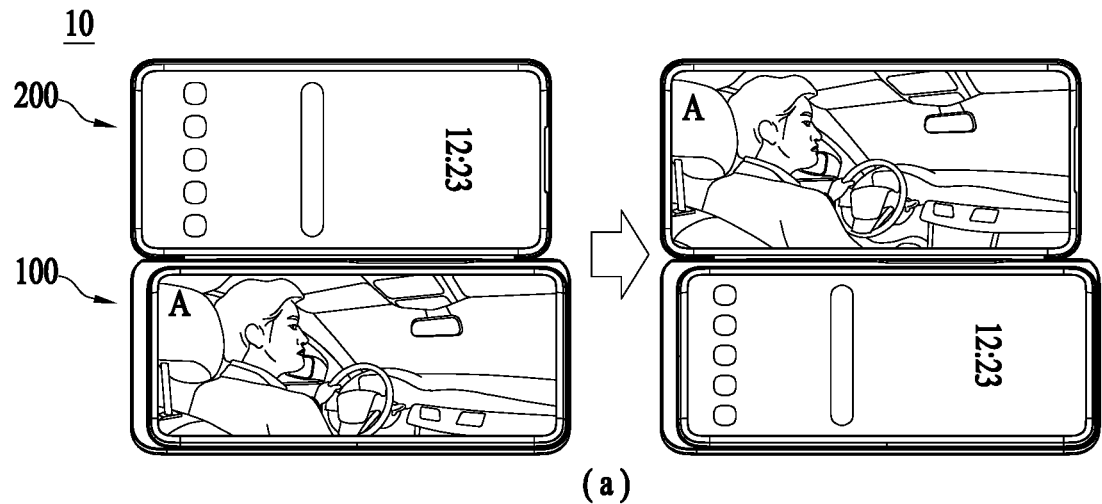
FIG. 9 illustrates some situations related to a new output of an application.
Figure 9:
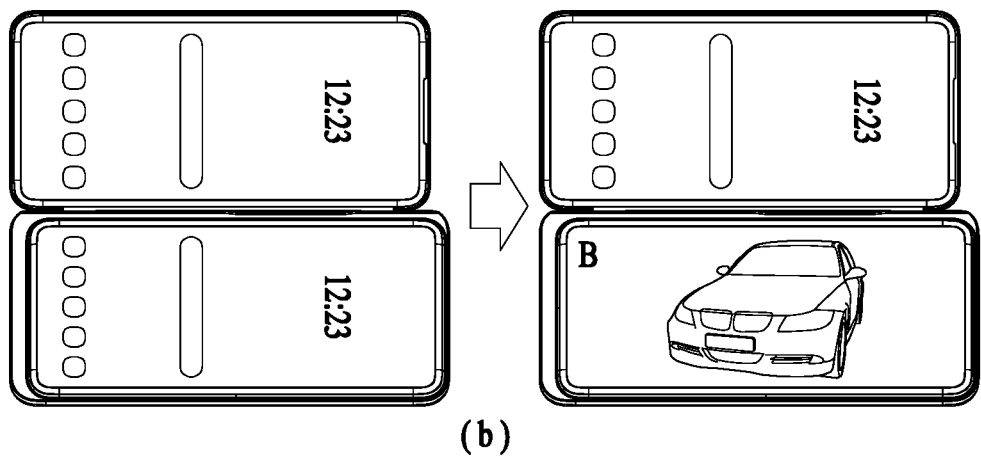
Figure 9:
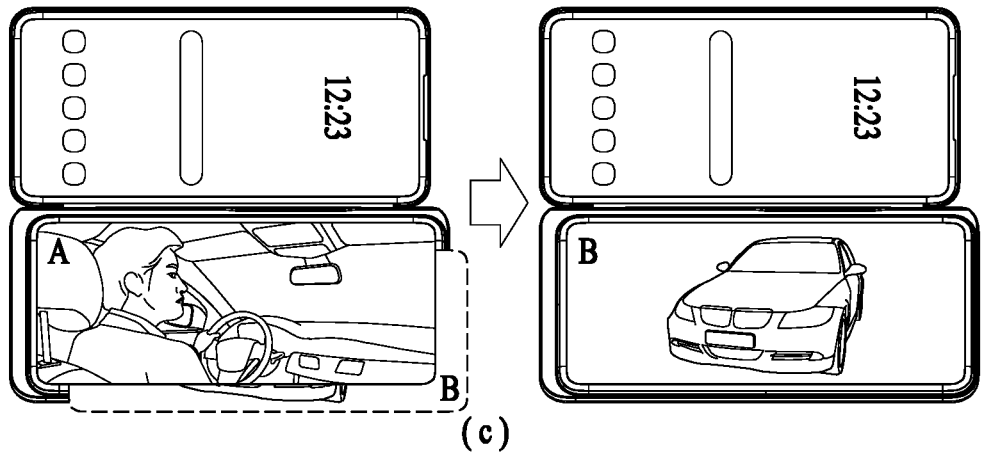

FIG. 8 is a flowchart related to an operation of the terminal set 10, and FIG. 9 illustrates some situations related to a new output of an application.

In order to solve the above problem, the terminal set 10 of the present disclosure proposes a method of synchronizing the outputting direction of a plurality of displays.

Below, the main body 100 is provided with the first display 151 and the sub body 200 is provided with the second display 261, as an example, but in some cases, more displays may be provided as described above.

First, the terminal set 10 may detect a new output signal regarding a first application in operation S810. Moreover, this new output signal may specify an application and may also include information of a display to output. For example, when a user clicks an execution icon of a "Message" application that is on the first display 151 but not being executed, a new output signal of the "Message" application to the first display 151 is generated, and the controller detects it. The first application indicated by the present disclosure is not limited in any other way, but it is premised that it is an application that may be selectively performed in the horizontal mode or the vertical mode.

The meaning of a new output of an application includes a variety of situations. For example, moving application A which is being output on the first display 151 to the second display 261, and outputting on the second display 261 corresponds to a new output of application A on the second display 261 (see (a) of FIG. 9). Also, commanding an execution of application B which is not being executed on the first display 151 corresponds to a new output of application B on the first display 151 (see (b) of FIG. 9). In addition, outputting application B that is being executed in a background state but not being outputted corresponds to a new output of application B (see (c) of FIG. 9).

As a new output signal regarding the first application is generated, the controller generates a window for the first application in operation S820 and retrieves an orientation value of the main body 100 provided with the sensor in operation S830.

The table below shows the output rotation values of each display allocated according to the retrieved orientation values of main body 100. The meanings of 0 to 3 of the orientation values and 0 to 3 of the output rotation values are the same as described above.

TABLE 1

| Retrieving | Orientation value | 0 | 1 | 2 | 3 |
|---|---|---|---|---|---|
| Allocation | First display Output rotation value | 0 | 1 | 0 | 3 |
|  | Second display Output rotation value | 0 | 1 | 0 | 3 |

That is, if an inclination of the main body 100 is within the screen rotation activation range, that is, if an orientation value is 0 or 2, an output rotation value is allocated to be 0 in operation S8402, and if an orientation value is 1, an output rotation value is allocated to be 1, and if an orientation value is 3, an output rotation value is allocated to be 3 in operation S8403.

Further, if an inclination of the main body 100 is within the screen rotation nonactivation range, that is, if an orientation value is −1 in operation S8401, the controller may not allocate an output rotation value to be 0, which is a default value, but may retrieve an output rotation value currently allocated to the first display 151 or the second display 261 in operation S850.

If at least one of the allocated output rotation values of the retrieved displays corresponds to an output rotation value of the horizontal mode, the controller outputs the first application in the horizontal mode (the normal horizontal mode or the reverse horizontal mode) of the corresponding output rotation value in operation S861. For example, if an output rotation value of the first display 151 is retrieved as 0, and an output rotation value of the second display 261 is retrieved as 1, the controller allocates an output rotation value corresponding to 1 and outputs the first application. Retrieving and allocation for each case are as shown in below Table 2, and the same is the case in which the output rotation values of the first display 151 and the second display 261 are opposite to each other.

TABLE 2

| Retrieving (1$^{st}$) | Orientation Value | −1 | −1 | −1 | −1 | −1 | −1 |
|---|---|---|---|---|---|---|---|
| Retrieving (2$^{nd}$) | First display Output rotation value | 0 | 0 | 0 | 1 | 1 | 3 |
|  | Second display Output rotation value | 0 | 1 | 3 | 1 | 3 | 3 |
| Allocation | First display Output rotation value | 0 | 1 | 3 | 1 | 1 | 3 |
|  | Second display Output rotation value | 0 | 1 | 3 | 1 | 3 | 3 |

Further, if there is no output rotation value of the horizontal mode among all output rotation values, all displays are vertically output in operation S862.

Referring to Table 2, there is no need to distinguish between the first display 151 and the second display 261 in the rests of the cases, but if a retrieved output rotation value of one display is 1 and a retrieved output rotation value of the other display is 3, by distinguishing each display, the output rotation value of 1 may still be allocated to the display of which retrieved output rotation value is 1, and the output rotation value of 3 may still be allocated to the display of which retrieved output rotation value is 3. That is, in this case, since it is highly likely that a user's intention, such as two people stand facing each other, is reflected to the both displays, the output rotation values are maintained as they are. Therefore, in this case, it depends on where the newly output application is output. In this respect, if retrieving output rotation values of a plurality of displays, the controller retrieves all of each output rotation value for the plurality of displays, and if at least one output rotation value of the horizontal mode is present, the controller may output the first application in the horizontal mode.

Meanwhile, in some cases, if output rotation values of a plurality of displays are sequentially retrieved and it is determined that at least one output rotation value in the horizontal mode is present, retrieving output rotation values of the other displays may be stopped, and the first application may be immediately output in the horizontal mode.

Figure 10:
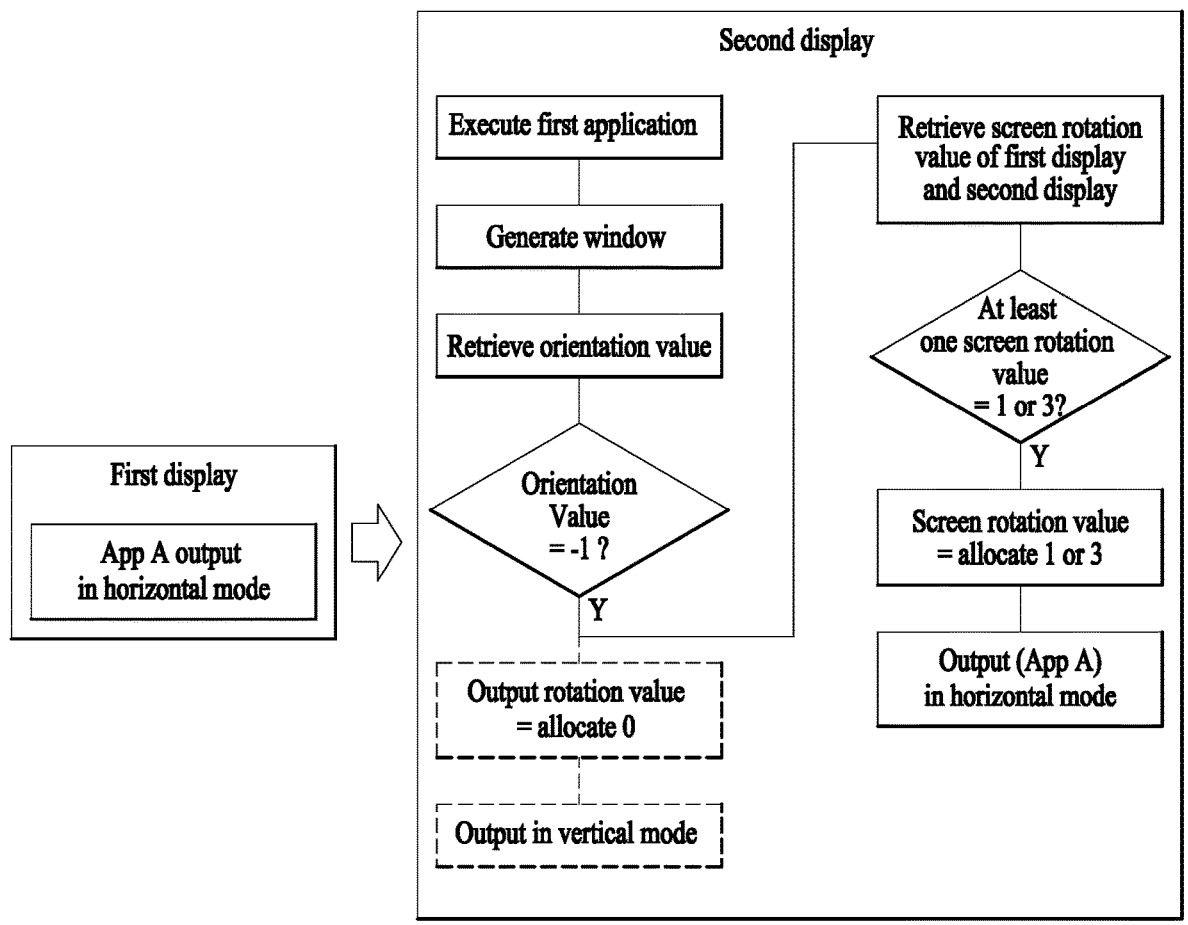
FIG. 10 is an example embodiment showing an application execution process of the terminal set.

FIG. 10 is an example embodiment showing an application execution process of the terminal set.

The example embodiment shows an aspect in which a screen is output according to the above described new output process of an application of the controller.

Application A is pre-output on the first display in the normal horizontal mode, the home screen is pre-output on the second display in the normal vertical mode, and the main body including the first display is placed on the floor surface.

A user may input a command for newly executing and outputting the first application on the second display. If the controller receives a new output signal of the first application on the second display, the controller generates a window of the first application.

The controller retrieves an inclination of the main body that the sensor measured. In the present example embodiment, since the main body is on the floor surface, an orientation value is "−1," which corresponds to the screen rotation nonactivation range.

Accordingly, it is determined whether current output rotation values of the first display and the second display are output rotation values corresponding to the horizontal mode. As the output rotation value of the first display is retrieved as 1 and the output rotation value of the second display as 0, all the output rotation values of the first and the second displays are allocated to be 1.

Thereafter, the controller outputs the generated window on the second display according to the output rotation value of 1, that is, in the normal horizontal mode.

As a result, without an additional operation for a screen rotation, a user may be provided with a state in which application A and the first application are output in the horizontal mode, respectively, on the first display and the second display.

Figure 11:
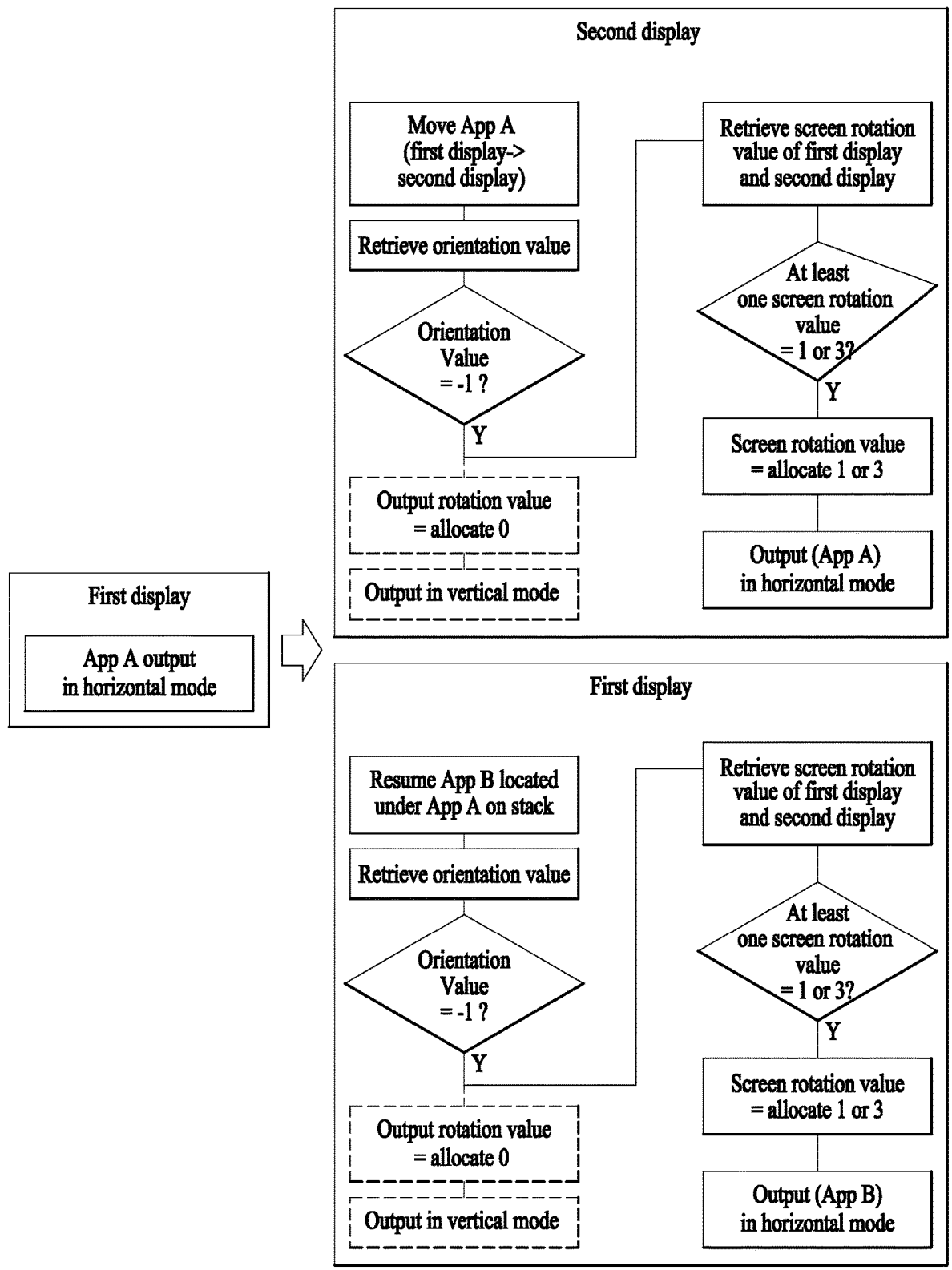
FIG. 11 is another example embodiment showing the application execution process of the terminal set.

FIG. 11 is another example embodiment showing the application execution process of the terminal set.

The example embodiment shows another aspect in which a screen is output according to the above described new output process of an application of the controller.

Before a new output signal regarding the first application is generated, the first application is output on the first display in the normal horizontal mode, the home screen is displayed on the second display in the vertical mode, and the main body including the first display is placed on the floor surface.

A user may input a command for moving the first application being output on the first display to the second display and outputting it on the second display.

The controller retrieves an inclination of the main body that the sensor measured. In the example embodiment, since the main body is on the floor surface, an orientation value is "−1," which corresponds to the screen rotation nonactivation range.

Since the orientation value corresponds to the screen rotation nonactivation range, it is determined whether the current output rotation values of the first display and the second display are a value corresponding to the horizontal mode. The controller retrieves that the output rotation value of the first display is 1 and the output rotation value of the second display is 0. Accordingly, the first application is output by 1 being allocated to the output rotation value of the second display.

As a result, the user may see the first application output on the first display in the normal horizontal mode on the second display as it is, without a separate operation for a screen rotation.

Meanwhile, as the first application moves to the second display, the first display outputs application B located on the lower stack of the first application.

The output of application B located on the lower stack is, as described above, also treated as a generation of a new output signal of application B to the first display, and thus it is output through the same process.

That is, according to the generation of the new output signal of application B, an orientation value is retrieved, and since the retrieved orientation value is −1, that is, an inclination of the main body that the sensor sensed is within the screen rotation nonactivation range, output rotation values of the first display and the second display are retrieved. Since the retrieved output rotation values of the first display and the second display correspond to an output rotation value of the horizontal mode, the output rotation value of the first display is maintained as 1, and application B is output on the first display in the normal horizontal mode in response to the output rotation value of 1.

Further, from the same viewpoint as in the present disclosure, if the user manually changes a screen output direction of one display while applications are being output on both displays, an output direction of the both applications may be changed to the output direction changed by the user.

Mode for Carrying Out the Invention

It is apparent to those skilled in the art that the present disclosure may be materialized in other specific forms without departing from the spirit and essential characteristics of the present disclosure.

The above detailed description should not be construed as limiting in all aspects and should be considered as illustrative. The scope of the disclosure should be determined by reasonable interpretation of the appended claims, and all changes within the equivalent scope of the disclosure are included in the scope of the disclosure.

INDUSTRIAL APPLICABILITY

Some of or all the above described features may be applied to the field corresponding to the terminal set and the method of controlling thereof related to the present disclosure.

The invention claimed is:

1. A terminal set comprising a main body and a sub body fastened to each other, the terminal set comprising:
    a first display provided on the main body;
    a second display provided on the sub body;
    an inclination sensor mounted on the main body and configured to sense an inclination of the main body; and
    a controller configured to execute an application so that the application is output on the first display or the second display,
    wherein if the controller receives a new output signal regarding a first application in a state in which the sensed inclination of the main body is within a screen rotation nonactivation range, the controller retrieves an output rotation value allocated to the first display and an output rotation value allocated to the second display, and if at least one thereof is an output rotation value corresponding to a horizontal mode, the controller outputs the first application in the horizontal mode.

2. The terminal set of claim 1, wherein the new output signal regarding the first application comprises at least one of:
    an output movement signal to the second display of the first application which is being output on the first display;
    an output movement signal to the first display of the first application which is being output on the second display;
    an output signal of the first application of a lower stack by an output movement of an a second application of an upper stack; and
    an output signal regarding the first application in a state in which a background is executed or not executed.

3. The terminal set of claim 1, wherein the screen rotation nonactivation range corresponds to a case in which a vertical upper axis of the main body is inclined forward by 25 degrees or more and rearward by 60 degrees or more, respectively, with respect to a vertical axis of a ground.

4. The terminal set of claim 1, wherein if the controller receives a screen rotation signal of any one of a second application which is being output on the first display and a third application which is being output on the second display, the controller rotates an output direction of the any one of the second and third applications, and matches an output direction of an other application of the second and third applications to the output direction of the any one of the second and third applications.

* * * * *